United States Patent Office 3,244,749
Patented Apr. 5, 1966

3,244,749
AMMONIUM SALTS OF 3-HYDROXYPENTAHALO-2-CYCLOPENTENONE
Edward D. Weil, Lewiston, N.Y., assignor to Hooker Chemical Corporation, Niagara Falls, N.Y., a corporation of New York
No Drawing. Filed Oct. 30, 1961, Ser. No. 148,706
4 Claims. (Cl. 260—563)

This invention relates to novel halogenated cyclic strongly acidic enols having the ability to form biologically-active salts and novel processes for their production.

More particularly, this invention describes salts of 3-hydroxypentahalo-2-cyclopentenone, said novel compositions being valuable as organic intermediates for preparing biocidal materials including fungicides. The class of substances intended to be within the scope of this invention has the structure:

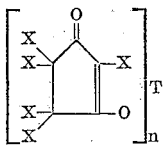

wherein T is selected from the group consisting of metallic cations, ammonium cations and substituted ammonium cations, and where $n$ is the valancy of the cation T and X is halogen.

Examples of metallic cations include but are not limited to alkaline earth metals such as calcium, strontium, barium, and magnesium, alkali metals, such as sodium, potassium, heavy metals such as lead, copper, mercury, iron, cobalt, chromium, manganese, arsenic, antimony, zinc, nickel, cadmium and the like.

Examples of substituted ammonium include but are not limited to mono-, di-, tri-, and tetraalkyl ammonium such as methylammonium, ethylammonium, amylammonium, decylammonium, stearylammonium, dimethyl-, diethyl-, dipropyl-, dibutyl-, diamyl-, dioctyl-, didecyl-, distearyl-ammonium, trimethyl-, triethyl-, tripropyl-, tributyl-, triamyl-, trioctyl-, trilaurylammonium, mono-, di-, and trialkanolammonium including mono-, di-, and triethanolammonium, propanolammonium, butanolammonium, tetraalkylammonium, including tetramethylammonium, trimethyl-(2-chloroethyl)ammonium, trimethyl-(2-hydroxyethyl)ammonium, also anilinium, N-methylanilinium, N,N-dimethylanilinium, pyridinium, N-lauryl pyridinium, N-cetylpyridinium, morpholinium, N-methylmorpholinium, piperazinium, benzylammonium, cyclohexylammonium, hydrazinium, hydroxylammonium, and the like.

The parent acid compounds of the salts enumerated above are 3-hydroxypentahalo-2-cyclopentenones, the compounds in the generic formula where T is hydrogen. These compounds are prepared in good yield from hexahalo-2-cyclopentenone as shown below:

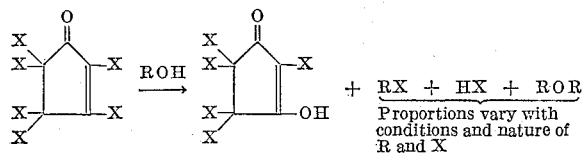

wherein X as herebefore defined and R is alkyl, preferably primary alkyl.

The above conversion of hexahalo-2-cyclopentenone to the enol, 3-hydroxypentahalo-2-cyclopentenone is carried out by heating the hexahalogenated starting material with a reactant possessing an aliphatic alcoholic hydroxyl group at temperatures of 20 to 120 degrees centigrade in the absence of a base.

While the inventive process is operable with any of the reagents and temperature conditions specified above, a reaction time of at least fifteen minutes is preferred because of freedom from undesirable side products. The preferred group of reactants having an available hydroxyl group are the primary aliphatic alcohols, which may be either unsubstituted or substituted by alkoxy, halogen or phenyl. The alkyl halides produced therefore are valuable co-products. These primary alcohol reactants are especially preferred over secondary and tertiary alcohols because the primary alcohols give rise to rapid reaction in the desired direction with fewer side reactions. Examples of primary alcohols which are suitable include methanol, ethanol, propanol, n-butanol, isobutanol, pri-amyl alcohol, n-octyl alcohol, other pri-octyl alcohols, pri-decyl alcohol, lauryl alcohol, stearyl alcohol, 2-choroethanol, 2-ethoxyethanol, benzyl alcohol, allyl alcohol, ethylene glycol, to name a few. While the reaction is operable as low as room temperature albeit more slowly, and as high as 150 degrees centigrade, though with lower yields because of competing side reactions, the preferred embodiment of this invention in its process aspect is to heat the commercially available hexachloro-2-cyclopentanone with a primary alcohol at temperatures between 50–150 degrees centigrade, and conveniently at reflux, where the alcohol refluxes below 150 degrees centigrade.

The enolic 3-hydroxypentahalo-2-cyclopentenones produced as described supra are stable water-soluble compounds with remarkable strongly acid properties resembling mineral acids such as hydrochloric, and sulfuric, but unlike the mineral acids, highly soluble in organic solvents. Thus the enols form salts by reaction with virtually any organic and inorganic basic materials such as inorganic and organic hydroxides, carbonates, oxides; and the salts of weak acids, such as carbonic or acetic, or even with salts of strong but volatile acids (e.g. HCl), said volatile acids being displaced and volatilized. More specific examples of the many substances which will readily form salt with 3-hydroxypentahalo-2-cyclopentenone include but are not limited to primary aliphatic and aromatic amines such as methylamine, ethylamine, octylamine, dodecylamine, and aniline, secondary aliphatic and aromatic amines such as dipropylamine and monomethylaniline, tertiary aliphatic, aromatic and heterocyclic amines, such as triamylamine, diethylaniline, and pyridine, quaternary ammonium bases such as tetramethylammonium and tetraethylammonium hydroxides, choline, choline chloride, as well as sulfonium and phosphonium hydroxides, acetates and the like.

The salts of 3-hydroxypentahalo-2-cyclopentenone are, in general, stable, neutral, easily handled substances and having useful biotoxic activity. For this purpose the water-soluble heavy metal salts such as copper, lead, mercury and the like are especially valuable since these cations themselves are frequently fungicidal or antimicrobial in themselves. Thus, these heavy metal salts of 3-hydroxypentahalo-2-cyclopentenone offers the surprising and dual advantage of a stable water-soluble source of heavy metal ion coupled to a biotoxic, particularly fungicidal, anionic moiety.

In its process aspect, this invention offers several unexpected advantages. For example, it is well known that hexachloro-2-cyclopentenone can be hydrolyzed by strong acids such as sulfuric acid to a diketone, tetrachlorocyclopentene-3,5-dione or to pentachloropentadienoic acid. It is also well known that in the presence of strong bases it can be hydrolyzed to the salts of pentachloropentadienoic acid. Therefore, it was most surprising to find that in the presence of an available OH from an alcohol, a stable enol, 3-hydroxypentachloro-2-cyclopentenone, is formed in good yield. Furthermore, unlike the one product of sulfuric acid catalyzed hydrolysis, the diketone which undergoes deep-seated breakdown in the presence of base and readily undergoes ring cleavage, the enol produced in the present invention is stable to bases and forms salts (supra) cleanly and in most cases, quantitatively. Another advantage of the inventive process is that it offers an economical source of valuable biotoxicants, intermediates and reaction catalysts.

In its composition aspect this invention offers several advantages of note. For example, as indicated earlier the salts of 3-hydroxypentahalo-2-cyclopentenone, particularly of 3-hydroxypentachloro-2-cyclopentenone are effective fungicides against plant pathogens, such as early blight (*Alternaria solani*) of tomatoes and other vegetables.

Other uses of the novel strongly-acid compounds of the invention take advantage of their remarkable combination of high water-solubility and high organic solubility. For example, the new enols are valuable as homogeneous catalysts for esterification. Unlike sulfuric acid, which is often used as an esterification catalyst, they are nonoxidizing in character and do not darken the esters by oxidative side-reactions. Consequently, they are useful as catalysts in preparation of esters for plasticizer use, where color of the product is critical to commercial acceptance. Being highly water-soluble, they are easily washed out of the finished product.

The novel enols are also useful as homogeneous catalysts for the cationic polymerization of olefins such as isobutylene, isoprene, cyclopentadiene, and the like. Polymers of cyclopentadiene produced by the aid of these enols are initiators and telomerizing agents may have useful electrical semi-conducting properties.

The halogenation products of these enols, especially the chlorination and bromination products such as hexachlorocyclopentane-3,5-dione and 1,1,2,2,4-pentachloro-4-bromocyclopentane-3,5-dione are valuable as biocidal toxicants.

Other advantages of these novel compositions will become apparent to those skilled in the art of chemistry.

The following additional examples are intended to further illustrate the inventive concepts. Except as set forth in the claims, these examples are not to be construed as being limiting in any manner whatsoever.

Example 1

Seventy parts of hexachloro-2-cyclopentenone were refluxed with 80 parts of absolute methyl alcohol for 20 hours in an apparatus fitted with a condenser cooled by water at 10–20 degrees centigrade. A gas was evolved which passed through the condenser and was collected by condensation in a Dry Ice-cooled trap. The identity of the condensate as $CH_3OCH_3$ and $CH_3Cl$ was established by infrared analysis, specific gravity and boiling point. Traces of HCl were also detected.

The solution in the reaction vessel was stripped under vacuum to remove $CH_3OH$ and dissolved HCl; the last traces of volatile components, mainly a few percent of unreacted hexachloro-2-cyclopentenone, were evaporated at 100 degrees centigrade under 0.05 mm. pressure. The residual solid, 50 parts by weight, was found to be 3-hydroxypentachloro-2-cyclopentenone of greater than 90 percent purity. Further purification was effected by slow sublimation at 100 degrees centigrade/0.05 mm. or by recrystallization from dry benzene.

The product was a nearly colorless crystalline solid, melting point 137 degrees centigrade. It was highly soluble in water to give a solution acidic to Congo red indicator. The infrared absorption spectrum showed the absorption bands of a ketonic carbonyl group, a carbon-to-carbon double bond and an —OH absorption band. No absorption band characteristic of a C—H linkage was in evidence. Proof that the C=O structures were located in 1,3 relationship on an intact 5-membered carbocyclic ring was obtained by passing chlorine into a dilute aqueous solution of the compound, causing rapid precipitation of the known compound hexachlorocyclopentane-3,5-dione, melting point 72 degrees centigrade. Further proof for the claimed structure of 3-hydroxypentachloro-2-cyclopentenone was given by the titration to neutrality of an aqueous solution of it by 0.1 N NaOH, to form the sodium salt of the compound. One milliequivalent of NaOH was required to neutralize 270.5 milligrams of the compound (theory 270.5).

*Analysis.*—Calcd. for $C_5HCl_5O_2$: Cl, 65.6. Found: Cl, 65.3.

Example 2

Hexachloro-2-cyclopentenone, 100 parts, was refluxed with 83 parts of ethanol for 20 hours, under a condenser cooled by water at 25 degrees centigrade. Ethyl chloride was evolved and passed through the condenser as a gas, 10 parts being collected in an ice-cooled trap. Traces of ethyl ether and hydrogen chloride were also collected.

Upon stripping of the unreacted ethanol and unreacted hexachloro-2-cyclopentenone, 52 parts of the enolic product, melting point 135 to 137 degrees centigrade, was obtained as residue and was characterized by infrared spectrum and water solubility.

Example 3

A solution of 100 parts hexachloro-2-cyclopentenone in 80 parts of isopropanol was heated at reflux for 20 hours, then fractionated to collect a small amount of isopropyl chloride, boiling point 36 degrees centigrade, excess alcohol, and unreacted hexachlorocyclopentenone leaving as residue a small yield of the crude enol which was sublimed at 100 degrees centigrade/0.05 mm. to collect the pure crystalline $C_5HO_2Cl_5$, melting point 137 degree centigrade.

Example 4

A solution of 100 parts hexachloro-2-cyclopentenone in 200 parts of amyl alcohol was heated on the steam bath for 20 hours. After stripping amyl chloride, amyl alcohol and unreacted ketone, a satisfactory yield of the enol $C_5HO_2Cl_5$ was obtained in crystalline form.

Example 5

To a solution of 3-hydroxypentachloro-2-cyclopentenone in diethyl ether was added 1 mole of equivalent triethylamine with stirring. An immediate precipitate formed and was removed by filtration. The product was a moderately water-soluble crystalline solid, melting point 121.5 to 122 degrees centigrade, which upon treatment with caustic released the odor of triethylamine. The analysis was correct for the triethylamine salt of 3-hydroxypentachloro-2-cyclopentenone.

*Analysis.*—Calcd. for $C_{11}H_{16}Cl_5O_2N$: N, 3.77. Found: N, 3.80.

Example 6

A solution of 0.02 mole of 3-hydroxypentachloro-2-cyclopentenone in 20 cc. of water was added to a solution of 0.01 mole of cupric acetate in 20 cc. of water. No precipitate formed. The solution was evaporated to dryness, causing evolution of acetic acid. The solid residue was baked at 100 degrees centigrade/10 mm. until no further odor of acetic acid was detected, and then held at 100 degrees centigrade/0.005 mm. to remove water of hydration. This left a blue solid having the correct analysis for the cupric salt of 3-hydroxypentachloro-2-cyclopentenone.

*Analysis.*—Calcd. for $C_{10}Cl_{10}O_4Cu$: Cu, 10.8 Found: Cu, 10.5.

Example 7

Thirty-five tomato plants infected with *Alternaria solani*; 5 plants are each sprayed with 0.04 percent solutions of the ammonium, mercuric, manganous, nickelous, zinc and ferrous salts of the enol $C_5HO_2Cl_5$ made as above. Thirty-five plants also similarly infected are left treated as controls. After two weeks the plants are inspected. None of the 35 treated plants had any substantial symptoms of the disease while the untreated plants had severe symptoms (leaf lesions) characteristic of early blight disease.

Example 8

A solution of 1.86 parts of aniline in 10 parts of ethyl ether was added to 5.4 parts of the enol $C_5HO_2Cl_5$ in 20 parts of ethyl ether. An oil precipitated and then crystallized. The crystals were filtered out, washed with ether, and dried to obtain 6 parts of colorless crystalline solid, melting point 164.5–165 degrees centigrade (decomp.).

Calcd. for $C_{11}H_8O_2Cl_5N$: N, 3.85. Found: N, 3.88.

At 0.1 percent concentration in water, the compound when sprayed onto tomato plants infected with early blight disease gave 95 percent repression of lesions, relative to unsprayed controls.

Example 9

To 5.4 parts of the enol $C_5HO_2Cl_5$ in 10 parts of ether was added 6.3 parts of Primene JM–T (a commercial fatty amine, principally tertiary amines ranging from $C_{18}H_{37}NH_2$ to $C_{22}H_{45}NH_2$, manufactured by Rohm & Haas Company). An exotherm was noted. The ether was evaporated thoroughly leaving 13 parts of a brown syrup, which, when taken up in a small amount of alcohol and then added to water, gave a clear solution with bacteriostatic properties.

At 10 p.p.m. of the salt in nutrient agar, the growth of *Staphylococcus aureus* was substantially completely inhibited during a seven-day incubation at 27 degrees centigrade.

Example 10

To 5.4 parts of the enol $C_5HO_2Cl_5$ in 10 parts of ether was added 6.0 parts of dimethyl stearylamine. An exotherm was noted, and solids were deposited. The ether was removed at 100 degrees centigrade, having 12 parts of nearly colorless wax, melting point 73–80 degrees centigrade.

This salt at 10 p.p.m. in nutrient agar substantially prevented the growth of an innocculum of *Staphylococcus aureus* and *Escherichia coli*.

Example 11

A solution of 5.4 parts of the enol $C_5HO_2Cl_5$ in 10 parts of ether was treated with 2.5 parts of 2-ethylhexylamine. When heat of neutralization subsided, the ether was completely stripped leaving 7.9 parts of a colorless wax, melting point 94–102 degrees centigrade.

This substance, at 0.01 percent completely inhibited the germination of spores of *Monolinia fructicola* in a test patterned after the standard slide germination test of the American Phytopathological Society.

Example 12

A solution of 6.0 parts of N-lauryl pyridinium chloride in 10 parts of ethanol was admixed with 5.4 parts of the enol $C_5HO_2Cl_5$, and distilled to evaporate the solvent. The evolution of hydrogen chloride was noted by titrating the collected distillate. The residual oil was heated for several hours at 100 degrees centigrade under 10–15 mm. vacuum. Titration of a sample of the residual oil by the Volhard method then showed that substantially all of the chloride had been lost as hydrogen chloride, leaving the lauryl pyridinium salt of the enol.

By means of 20 p.p.m. of this salt in a slurry of paper pulp, the growth of algae following inoculation was substantially prevented.

I claim:

1. A compound of the formula:

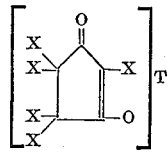

wherein X is a halogen selected from the group consisting of chlorine and bromine, and T is selected from the group consisting of ammonium and substituted ammonium cations of formula

wherein R, R', R" and R'" are independently selected from the group consisting of phenyl, hydrogen and alkyl of 1 to 18 carbon atoms and, when R and R' are conjoined, they comprise a ring of five carbon atoms.

2. The compositions of claim 1 wherein T is the ammonium cation and X is chlorine.

3. The composition of claim 1 wherein T is of formula

wherein R, R', R" and R'" are independently selected from the group consisting of phenyl, hydrogen and alkyl of 1 to 18 carbon atoms and, when R and R' are conjoined, they comprise a ring of five carbon atoms.

4. The triethylamine salt of 3-hydroxypentachloro-2-cyclopentenone.

References Cited by the Examiner

McBee et al.: American Chemical Society, Abstracts of Papers, 137th Meeting, pages 31-0 to 32-0 (1960).
Newcomer and McBee: J.A.C.S. 71, 946–951 (1949).
Zincke et al.: Ann. 299, 367–382 (1897).

WALTER A. MODANCE, *Primary Examiner.*

IRVING MARCUS, NICHOLAS S. RIZZO, *Examiners.*

JOSEPH W. MOLASKY, ROBERT L. PRICE, A. D. SPEVACK, *Assistant Examiners.*